United States Patent Office 3,366,630
Patented Jan. 30, 1968

3,366,630
2 - (4' - AMIDOSTYRYL) - BENZOXAZOLES AND METHOD FOR USING THE SAME FOR THE OPTICAL BRIGHTENING OF TEXTILES
Erich Schinzel, Frankfurt am Main, Ulrich Pintschovius, Kelkheim, Taunus, and Karl Heinz Lebkücher, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 20, 1964, Ser. No. 405,280
Claims priority, application Germany, Oct. 26, 1963, F 41,110
6 Claims. (Cl. 260—240)

The use of benzoxazole derivatives as optical brighteners is already known. For example, α,β-di-[benzoxazolyl-(2)]-ethylenes are recommended in the literature for the brightening of synthetic fibers for instance, cellulose ester fibers, particularly fibers of cellulose-acetate, of polyacrylonitrile, and of polyesters such as polyethylene-glycol-terephthalate or polyvinyl-chloride.

We have found that colorless or nearly colorless fluorescent benzoxazole compounds corresponding to the general formula (I) 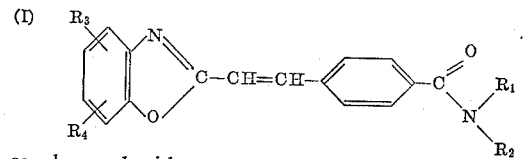

can be used with great success as optical brighteners. In the Formula I $R_1$ and $R_2$ may stand for hydrogen, an alkyl-, cycloalkyl-, hydroxyalkyl-, alkoxy-alkyl-, carboxyalkyl-, or sulfo-alkyl-group, an N,N-dialkylamino-alkygroup or a corresponding quaternary triakyl-ammoniumalkyl-group, or a substituted aryl- or aralkyl-group. Furthermore, $R_1$ and $R_2$ together may form the members of a nitrogen-containing heterocyclic ring. $R_3$ and $R_4$ may represent hydrogen, an alkyl-, alkoxy-, or an aryl-group, a halogen atom or, taken together form a carbocyclic or heterocyclic ring fused to the benzene ring. If the compounds of Formula I contain alkyl radicals, radicals having up to 4 carbon atoms inclusively are preferred. The benzoxazoles of Formula I can be produced in different ways, for instance by reaction of the acid chlorides or methyl esters of 2-(4'-carboxystyryl)-benzoxazoles of the formula (II) 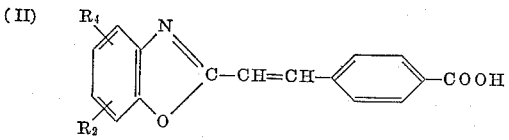

with amines of the formula $R_1$—NH—$R_2$.

Another production method consists in condensing cinnamic acid chlorides of the Formula III with o-aminophenols of the Formula IV to obtain o-cinnamyl-amino-phenols.

(III) 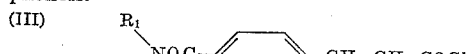

(IV) 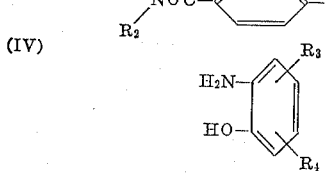

The latter are then cyclized in solvents of a high boiling point in the presence of catalytic amounts of zinc chloride in order to obtain benzoxazoles (I).

Furthermore, compounds of the Formula I in which $R_1$ and $R_2$ stand for hydrogen can be prepared from benzoxazoles of the Formula V by hydrolysis of the cyano-group into the carbonamide-group.

(V) 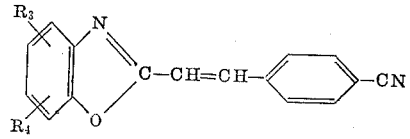

The radicals $R_1$ and $R_4$ indicated in the Formulas II–V have the meanings given in Formula I.

As amines $R_1$—NH—$R_2$ there are mentioned, for instance: ammonia, methylamine, ethylamine, n-propylamine, allylamine, n-butylamine, isobutylamine, n-hexylamine, n-octylamine, dodecylamine, stearylamine, oleylamine, dimethylamine, diethylamine, di-n-butyl-amine, di-iso-hexylamine, N-methyl-N-stearyl-amine, N-methyl-N-dodecyl-amine, cyclohexylamine, ethanolamine, 3 - hydroxy-n-propyl-amine, di-(3 - hydroxy-n-propyl)-amine, 10-hydroxy-decyl-amine, 6-hydroxy-hexyl-amine, N-methyl-N-(2-methyl-5-hydroxy)-hexyl-(3)-amine and diethanolamine, β - methoxy-ethyl-amine, 6 - methoxy-hexylamine, amino-acetic acid, methylaminoacetic acid, leucine, valine, β-alanine, 2-amino-caproic acid, 4-amino-butyric acid, 2 - amino-ethane-sulfonic acid, 2-methylamino-ethane-sulfonic acid, β-dimethylaminoethyl-amine, aniline, aniline-2-sulfonic acid, aniline-3-sulfonic acid and aniline-4-sulfonic acid, anthranilic acid, p - aminobenzoic acid, toluidine, p-chloraniline, anisidine, N-methylaniline, benzyl-ethylamine and β-phenyl-ethylamine, N-methyl-N-benzyl-amine, piperidine, morpholine and piperazine.

As o-amino-phenols or o-amino-naphthols (IV) there may be used, for instance, o-amino-phenol, 3-amino-4-hydroxy-1-methyl-benzene, 3 - amino-2-hydroxy-1-methyl-benzene, 4-amino-3-hydroxy-1-methyl-benzene, 3-amino-4-hydroxy-1-dodecyl-benzene, 3-amino-4-hydroxy-1-hexyl-benzene, 3-amino-4-hydroxy-1-hexadecyl-benzene, 5-amino-4-hydroxy-1,2-dimethyl-benzene, 5 - amino-4-hydroxy-1,3 - dimethyl-benzene, 3-amino-4-hydroxy-1-tert.-butyl-benzene, 5,6,7,8-tetrahydro-1-amino-2-naphthol, 5,6,7,8-tetrahydro-3-amino-2-naphthol, 5 - amino-6-hydroxy-hydrindene, 6 - amino-5-hydroxy-2-thia-indane, 1-amino-2-naphthol, 2-amino-1-naphthol, 3-amino-4-hydroxy-diphenyl, 3 - amino-4-hydroxy-1-methoxy-benzene, 3-amino-4-hydroxy-1-butyloxy-benzene, 3-amino-4-hydroxy-1-dodecyloxy-benzene, 6 - chloro-4-amino-3-hydroxy-1-methyl-benzene.

The novel compounds are characterized by an extraordinary fluorescent power and a very good resistance to light in the brightening of fibrous material, above all of polyesters of the type of polyethylene-glycol-terephthalate, acetylated cellulose, polyacrylonitrile, polyamide fibers and wool.

The brighteners obtained according to the present invention can be used in known manner in the form of solutions in water or in organic solvents or in water containing water-soluble organic solvents such as, for instance, dimethyl-formamide, dioxane and the like, or in the form of dispersions, if desired with the aid of dispersing agents. The amounts required may vary within wide limits, for example, between about 0.001% and about 1%, preferably between about 0.01 and 0.5%, and can be easily ascertained by preliminary tests.

The novel compounds can likewise be used together with chemical bleaching agents, for instance oxidizing or reducing agents such as sodium chlorite, sodium dithionite, or sodium boron hydride. These novel compounds can likewise be added to commercial detergents in order to improve the appearance of the washed goods. Even with washing temperatures below the boiling point, good brightening effects are yielded on polyester fibers.

Furthermore, the compounds can be added to the spinning masses and cast masses used for the production of synthetic fibers, threads, films or other structures. The following examples show a number of possibilities for the application of said compounds but they are not intended to be limiting.

EXAMPLE 1

A bleached fabric of polyethylene-glycol-terephthalate fibers is impregnated in a bath containing per liter 8 grams of the compound (VI)

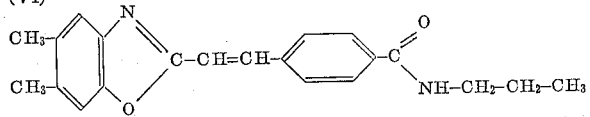

and squeezed to 60° of liquor absorption (referred to the weight of the goods). The material is impregnated with a cold aqueous dispersion of this substance. The goods are then treated for 60 seconds in a stream of hot air of 190° C. passing on both sides of the goods. By this application, the reflectivity of the goods for light of a wavelength of 460 millimicrons is increased from 84% to 92%.

The afore-mentioned n-propylamide of the Formula VI can be prepared in the following manner: about 12 parts by weight of n-propylamine are dropped into a 70° C. solution of 31.2 parts by weight of 2-(4'-chlorocarbonyl-styryl)-5,6-dimethylbenzoxazole in 330 parts by weight of chlorobenzene. The mixture is allowed to react for 1 hour, the major part of the chlorobenzene is distilled off and 100 parts by weight of cyclohexane are added to the residue. After complete crystallization, the Compound VI is filtered off with suction and washed with cyclohexane and water. 30 parts by weight of crude product are obtained melting at 218–220° C. By recrystallization from n-butanol the melting point can be increased to 219.5 to 221° C.

The chlorobenzene-solution of 2-(4'-chlorocarbonyl-styryl)-5,6-dimethyl-benzoxazole can be produced in the following manner: 29.5 parts by weight of 2-(4'-carboxy-styryl)-5,6-dimethyl-benzoxazole are heated in 330 parts by weight of chlorobenzene with 12.5 parts by volume of thionyl-chloride to 70° C. until dissolution sets in. The excess thionyl-chloride is then distilled off by passing nitrogen through the reaction mixture and the solution obtained is used for the reaction with the primary and secondary amines. Instead of Compound VI there can likewise be used the substances indicated in the following Table 1.

Table 1

$CH_3$—, $CH_3$—, benzoxazole ring—C—CH=CH—phenyl—CO—R

|  | Constitution | Melting Point, °C. |
|---|---|---|
| VII | R=NH—$CH_3$ | 263–264 |
| VIII | =NH—$CH_2CH_3$ | 241–243 |
| IX | =NH—$CH_2CH_2CH_2CH_3$ | 213–214 |
| X | =—N(—$CH_2CH_3$)(—$CH_2CH_3$) | 164–165.5 |
| XI | =—N(—$CH_3$)(—$CH_2C_6H_5$) | 154–155.5 |
| XII | =—N(—$CH_3$)(—$C_6H_5$) | 210–212 |
| XIII | =—N(—$CH_2CH_2OH$)(—$CH_2CH_2OH$) | 193–195.5 |

EXAMPLE 2

A bleached fabric of polyethylene-glycol-terephthalate threads is treated at a goods-to-liquor ratio of 1:40 for 90 minutes at 120° C. in a vessel under pressure with a 0.2% aqueous dispersion (referred to the weight of the goods) of the compound (XIV)

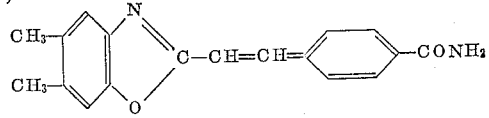

A sample of the goods—after rinsing and drying—shows a brilliant white reddish shade. The degree of whiteness attained with a brightening at 100° C. is somewhat inferior to that attained with a brightening at 120° C.

The carbonamide of the Formula XIV can be obtained in the following manner: 10 parts by weight of 2-(4'-cyano-styryl)-5,6-dimethyl-benzoxazole are introduced at 15–20° C. into 100 parts by weight of concentrated sulfuric acid and stirred at room temperature for about 20 hours. The homogeneous solution which has formed is poured on about a four-fold amount of ice, and the separating yellowish product is filtered off with suction and washed until the wash water shows a neutral reaction to Congo paper.

About 10 parts by weight of Compound XIV are obtained which, after renewed recrystallization from a large amount of glacial acetic acid or dimethyl-formamide, melts at 315–316° C. Instead of Compound XIV, there can likewise be used the Compounds VI, VII, VIII, IX and XI (Table 1).

EXAMPLE 3

An unbleached fabric of polyethylene-glycol-terephthalate threads is treated at a goods-to-liquor ratio of 1:20 for 30 minutes at 80° C. in a bath at a pH-value of 3.5 (adjusted by means of $H_2SO_4$) and containing 1.2% of sodium chlorite (100%) and 0.8% of Compound VII (Table 1) in the form of a dispersion. Bleaching is continued for 30 minutes at boiling temperature. The white shade obtained in this way is superior by 8% to that obtained without addition of Compound VII.

Instead of Compound VII, there can likewise be used, for instance, the Compounds VIII, IX, X, XI (Table 1) and VI.

EXAMPLE 4

A fabric of polyethylene-glycol-terephthalate threads bleached in the usual manner is impregnated with a dispersion containing 50 grams/liter of a precondensate of methylolmelamine with highly oxethylated triethanolamine (molecular weight about 1500) quaternized with dimethylsulfate
4 grams/liter of $NH_4Cl$
13.4 grams/liter of the Compound IX (Table 1)

and squeezed to a bath absorption of 60%. The goods are then exposed for 1 hour to dry heat of 190° C. Due to this treatment, the fabric shows a clear white shade as well as an increased electrical conductivity resulting in reduced attraction of dust particles.

EXAMPLE 5

A bleached fabric of polycaprolactam threads is treated at a goods-to-liquor ratio of 1:20 for 30 minutes at 60–65° C. and a pH-value of 4 with 0.18 gram/liter of Compound XI (Table 1) in the form of a dispersion. The goods are further treated for 45 minutes at 70° C. with 1.8 grams/liter of $Na_2S_2O_4$ and 1.2 grams/liter of $Na_4P_2O_7$. They show a brilliant, uniform white shade. The reflectivity is increased by 13%.

Instead of Compound XI there can likewise be used the compounds enumerated in Tables 1 and 2.

Table 2

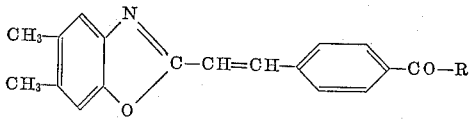

| | Constitution | Melting Point, °C. |
|---|---|---|
| XV | R=—N⟨H⟩ (piperidinyl) | 200–200.5 |
| XVI | =—N⟨O⟩ (morpholinyl) | 227–229 |
| XVII | =—NH—CH₂—CH₂—N(CH₃)(CH₃) | 177–179 |
| XVIII | =—NH—CH₂—CH₂—N(CH₃)(CH₃)·HCl | 275–276 |

EXAMPLE 6

A copolymer fabric consisting of threads of a copolymer containing at least 85% of polyacrylonitrile is treated at a goods-to-liquor ratio of 1:20 for 30 minutes at 85° C. and for 30 minutes at a temperature near the boiling point in a bath containing 0.6 gram/liter of $NaClO_2$ of 100% strength, at pH 3.5 (adjusted by means of sulfuric acid) and
0.2% of an aqueous dispersion of Compound VIII (Table 1)

This treating method causes the disappearance of the characteristic yellowish shade and attainment of a pretty white shade.

Instead of Compound VIII there can likewise be used the Compounds VII (Table 1), XVII and XVIII (Table 2) as well as the following water-soluble quaternary ammonium salt (XIX)

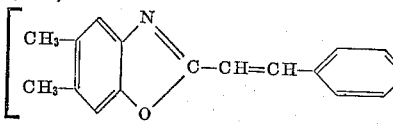

For the preparation of Compound XIX, 27.2 parts by weight of β-dimethyl-amino-ethylamide XVII are suspended in 80 parts by volume of methanol and 9.5 parts by weight of dimethyl-sulfate are added. The reaction mixture spontaneously heats to 44° C. It is then boiled for 15 minutes on a steam bath (with reflux), cooled and the reaction product crystallizing out is filtered off with suction. 30.5 parts by weight of Compound XIV are obtained which, upon repeated recrystallization from methanol melts at 244–245° C.

We claim:

1. A compound of the formula

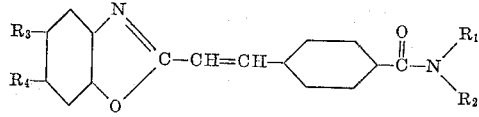

wherein $R_1$ and $R_2$, taken alone, each are hydrogen, alkyl, cyclohexyl, hydroxyalkyl, alkoxyalkyl, lower carboxyalkyl, lower sulfoalkyl, N,N-di-lower-alkylamino lower alkyl, tri-lower-alkylammonium lower alkyl, phenyl, lower alkylphenyl, sulfophenyl, carboxyphenyl, or chlorophenyl, and $R_1$ and $R_2$, taken together with the nitrogen atom to which they are joined, define piperidinyl, piperazinyl, or morpholinyl, and $R_3$ and $R_4$ are each hydrogen or methyl.

2. The compound of the formula

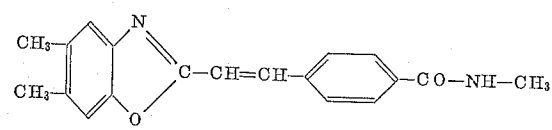

3. The compound of the formula

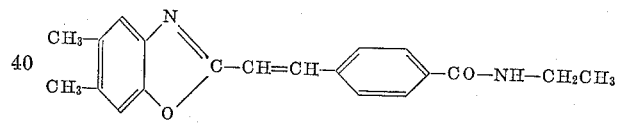

4. The compound of the formula

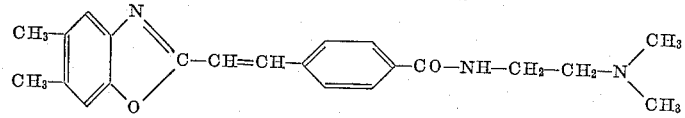

5. The compound of the formula

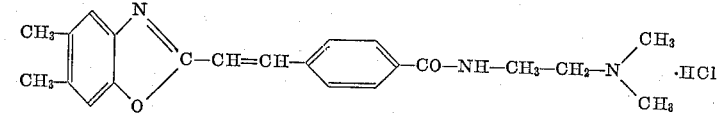

6. The compound of the formula

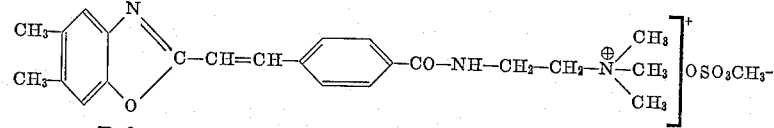

References Cited
FOREIGN PATENTS

| | | |
|---|---|---|
| 1,336,949 | 7/1963 | France. |
| 781,821 | 8/1957 | Great Britain. |
| 688,273 | 6/1964 | Canada. |
| 689,363 | 6/1964 | Canada. |

JOHN D. RANDOLPH, *Primary Examiner.*